United States Patent [19]

Willis, Jr. et al.

[11] 3,988,270

[45] Oct. 26, 1976

[54] EXTRUDABLE THERMOPLASTIC COMPOSITIONS CONTAINING A FLOUR FILLER

[75] Inventors: Melmuth S. Willis, Jr.; Melmuth S. Willis, Sr., both of Aiken; Jack D. Young, Gray Court, all of S.C.

[73] Assignee: Johnston Flour Mills, Inc., Johnston, S.C.

[22] Filed: June 9, 1975

[21] Appl. No.: 584,718

Related U.S. Application Data

[63] Continuation-in-part of Ser. No. 520,623, Nov. 4, 1974, abandoned.

[52] U.S. Cl. ............................... 260/17.4 R; 260/9
[51] Int. Cl.² ........................................... C08L 1/00
[58] Field of Search ........................... 260/17.4 R, 9

[56]       References Cited
           UNITED STATES PATENTS

| | | | |
|---|---|---|---|
| 2,319,182 | 5/1943 | Vander Pyl | 260/17.4 |
| 2,507,465 | 5/1950 | Ayers | 106/288 |
| 3,554,941 | 1/1971 | Varnell | 260/9 |
| 3,842,045 | 10/1974 | Campbell | 260/78 R |

OTHER PUBLICATIONS

Plastics Extrusion Technology and Theory, pp. 7, 442, 443, Schewkel.
Beck. Product Design, pp. 24, 27–33, 386 and 391, Beck,
Chem. Abst. 77:62974 re, Conger, "Foamed Polyurethane Laminates."

*Primary Examiner*—Edward M. Woodberry
*Attorney, Agent, or Firm*—Bailey, Dority & Flint

[57]            ABSTRACT

A thermoplastic composition suitable for extrusion from an extrusion apparatus consists essentially of a resin, from about 1% to about 30% by weight of a finely-divided filler selected from the group consisting of rice hull flour, cherry pit flour, pecan shell flour and walnut shell flour and the filler containing up to about 3.0% by weight of water. Addition of from less than 1% to up to about 5% by weight of lubricant, such as mineral oil permits the use of a finely-divided filler containing up to about 4.0% of water with an unvented extrusion apparatus and up to about 5.0% of water with a vented extrusion apparatus.

10 Claims, No Drawings

EXTRUDABLE THERMOPLASTIC COMPOSITIONS CONTAINING A FLOUR FILLER

This is a continuation-in-part application of co-pending application, Ser. No. 520,623, entitled EXTRUDABLE THERMOPLASTIC COMPOSITIONS, filed in the United States Patent Office on Nov. 4, 1974 and now abandoned.

This invention relates to thermoplastic compositions containing a filler selected from the group consisting of rice hull flour, cherry pit flour, pecan shell flour and walnut shell flour. The compositions of this invention are extrudable from vented and unvented extruders to produce high quality splay-free extrusions having good impact and tensile strength and little or no tendency to warp or contract.

BACKGROUND OF THE INVENTION

The extrusion of thermoplastic materials, as presently practiced, is based on the technique developed by Bewley in the 1840's. Essentially, the process involves feeding granular thermoplastic material continuously from a hopper to a heated cylinder in which an archimedean screw moves the softened polymer and forces the polymer through a die of the desired profile. During transport, the temperature of the plastic material is increased both by contact with the hot walls of the heated cylinder or barrel and by frictional heat developed during working. Kirk-Othmer, "Encyclopedia of Chemical Technology," II, Interscience publishers, New York, Vol. 15 (1968) at 805.

In the fabrication of plastic bodies, it is common to add fillers. Fillers are inert, generally low-cost, materials added to resinous bodies to make the resulting product less expensive or to effect other desirable properties. Fillers generally provide several advantages, including increased strength and stiffness, cost reduction, decreased shrinkage, improved wet strength properties, attractive color or appearance, higher heat resistance, and the like. On the other hand, addition of fillers to a plastic matrix may impose limitations on the mode of fabrication used, inhibit curing reactions of thermoset resins, decrease storage life of the resins or increase the density of the product.

Fillers are usually granular or particulate inorganic material, although fibrous fillers are sometimes used. Among fillers used in large volumes in reinforced plastics are alumina, asbestos, chalk, calcium silicates, glass beads, graphite or carbon black, iron oxides, magnesium oxide, mica, silica, titanium dioxide and clays, such as kaolin and montmorillonite. Kirk-Othmer, supra, Vol 12 (1967) at 191. The cost of fillers such as clay is as low as 1 cent per pound whereas a high quality magnesium oxide filler costs of the order of 28 cents per pound and would be used sparingly, especially in relatively inexpensive resins, unless its use were essential for some reason.

The use of nutshell flours as fillers is disclosed broadly in Kirk-Othmer, supra, Vol. 14 (1967), at 142. For example, walnut-shell flour has been used in radio horns and loudspeakers. Also, floor coverings have been developed from a mixture of nutshell flour, water-insoluble aluminum, pigment and resins. The material is applied to a flexible base and then covered with coloring and binding material to fill any pores or crevices.

With respect to curable polyesters, such as semi-flexible resin containing 90% by weight of Cyanamid EPX-279-1 and 10% by weight of EPX-187-3, with 25 parts per hundred of added styrene, optimization data have been developed for inclusion of certain types of fillers, more specifically, clay, marble, pecan shell flour and glass microballoons. W. C. Jones, III, "Optimization of the Filler Content of Filled Polyester Resin," *J. Applied Polymer Sci.*, Vol. 15 (1971) at 1109. As shown from the following material compiled by Jones, nut shell flour is competitive economically with clay and certain types of marble fillers:

| Density and Costs of Resins and Fillers | | | |
|---|---|---|---|
| Material | Density | Cost | Cost |
| | g/ml | $/lb. | $/liter |
| Polyester resin | 1.2 | 0.25 | 0.666 |
| I.G. 101 Microballoons | 0.34 | 0.69 | 0.517 |
| Nut Shell Flour | 1.30 | 0.04 | 0.114 |
| Marble | | | |
|   Gamma-Sperse 255 | 2.71 | 0.012 | 0.072 |
|   RO-40 | 2.71 | 0.005 | 0.030 |
|   P4-40 | 2.71 | 0.005 | 0.030 |
| Clay | | | |
|   Hydrite 10 | 2.58 | 0.026 | 0.148 |
|   Hydrite Flat D | 2.58 | 0.014 | 0.080 |
|   Hydrite MP | 2.58 | 0.015 | 0.085 |

However, the prior art does not teach the use of dried nut shell flour as a filler or extender containing less than 5% water for extrudable thermoplastic polymers, especially polyamides and thermoplastics derived from ethylenically unsaturated monomers, e.g., polystyrene, polyethylene and polypropylene.

SUMMARY OF THE INVENTION

It has been found, in accordance with this invention, that thermoplastic compositions which are extrudable to form a splay-free product having acceptable tensile strength and impact properties and little or no tendency to warp or contract consist essentially of a thermoplastic resin containing from about 1% to about 30% by weight of finely divided filler dried to contain less than 5% water selected from the group consisting of rice hull flour, cherry pit flour, pecan shell flour and walnut shell flour.

More specifically, extrudable thermoplastic compositions of this invention can contain a finely divided filler having up to about 3.0% by weight of water and can be processed in an unvented extruder. Compositions according to this invention containing from about less than 1.0% by weight to about 5.0% by weight of lubricant, such as mineral oil, and said filler having up to about 4.0% by weight of water can be processed using an unvented extruder and using a vented extruder up to 5.0% water. The 4.0% and 5.0% mentioned herein is 4.0% and 5.0% by weight of the filler material and not by weight of the total composition.

It is the object of this invention to provide thermoplastic compositions extrudable from an extruder to produce splay-free extrusions with good tensile strength and impact properties and little or no tendency to warp or contract. These compositions consist essentially of a resin selected from among polyamides and polymers of ethylenically unsaturated monomers, including polystyrene, polyethylene and polypropylene, and from about 1 to about 30% by weight of a finely-divided filler selected from the group consisting of rice hull flour, cherry pit flour, pecan shell flour and walnut shell flour having up to about 3.0% by weight of water.

More specifically, it is an object of this invention to provide compositions which can be extruded from an extruder to produce extrusions of high quality as above. These compositions are provided by the addition of from less than 1% to up to about 5.0% by weight of lubricant to the basic resin-filler composition, which can contain a filler having up to about 4.0% by weight of water.

DESCRIPTION OF THE INVENTION

"Resin" as used in the specification and claims, means a resin selected from the group consisting of polyamides and polymers from ethylenically unsaturated monomers selected from the group consisting of polystyrene, polyethylene and polypropylene.

"Polyamide", for the purposes of the specification and claims, includes extrusion-grade materials generically known as nylons. One common polyamide is the condensation product of hexamethylene diamine and adipic acid and known as nylon 6—6. Another, produced by condensation of E-captrolactam, is known as nylon-6. Other commonly used and readily available polyamides include nylon 6–10, nylon-11 and nylon-12.

According to Kirk-Othmer, supra, Vol. 16 (1968), at 95, use of clays, silicates and oxides or other nonreinforcing fillers in polyamides is uncommon because addition of these materials, even in small amounts, lowers polyamide properties.

In the processing of polyamide compositions, any extruder of sufficient heating capacity which permits continuous operation in the temperature range from 300°–800° F. is considered suitable. Generally, electrically heated extruders are preferred to oil-heated types. Extrudable polyamide compositions prepared according to this invention are usually processed at the lower end of the specified temperature range, from about 300°–500° F. Preferably, the extrusion temperature is from about 390° to about 500° F.

Exemplary of a polyamide resin suitable for use in the practice of this invention in Zytel R nylon resin, a produce of E. I. duPont de Nemours & Co., Wilmington, Del.

"Polymers from ethylenically unsaturated monomers," as used herein, means polystyrene, polyethylene and polypropylene.

Polystyrene is a polymer consisting essentially of styrene units. The definition of polystyrene includes both general purpose polystyrene and isotactic polystyrene. The general purpose resin is a high molecular weight material (MW = 2–3 × 105). General purpose polystyrene, according to Kirk-Othmer, supra, Vol. 19 (1969), after 89, is crystal clear, hard, rigid, and free of odor and taste.

It will be understood that polystyrene resins containing stabilizers, e.g., light stabilizers, ultraviolet screening agents, etc. and antioxidants are entirely acceptable for the purposes of this invention, as are polystyrene resins containing antistatic additives or blowing agents.

The extrusion of polystyrene is considered one of the most satisfactory methods of fabrication, particularly for end uses such as sheet, pipe and films, because of a relatively high throughput rate. Single-screw extruders, especially those with a L/D ratio of 20–24:1, are normally satisfactory with polystyrene plastics. However, careful drying of the resin (to 0.03–0.05% maximum water) is required for obtaining high-quality sheet by extrusion, Kirk-Othmer, ibid., at 110.

A resin typical of those suitable for the practice of this invention is Dylite R expandable polystyrene, obtainable from Sinclair-Koppers Co., Pittsburgh, Pa. The extrudable polystyrene compositions of this invention are generally extruded in the temperature range 375°–450° F., but more preferably from about 415° to about 420° F.

"Polyethylene," as used in the specification and claims, includes high pressure polyethylenes, which are of low and intermediate densities, and linear high density polyethylenes prepared according to processes developed by Phillips Petroleum Co., Standard Oil Co. (Indiana) and Ziegler. Any of these types of resins can be used in preparing the extrudable compositions of this invention. See, generally, Kirk-Othmer, supra, Vol. 14 (1967) after 217.

High pressure polyethylene is fabricated by heating and melting, followed by shaping and cooling. An extruder is commonly, and most conveniently, used to provide a melt which is extruded through a suitably shaped die. The molten polyethylene is then cooled to a solid, either by air, water or contact with a cooled metal surface.

High density polyethylene, that is, the types obtained by the Phillips, Standard of Indiana and Ziegler processes, are handled slightly differently from the low density product because the high density product has a higher melting point, heat content and change of specific volume with temperature than the low density product. Thus the high density product is preferably extruded using equipment which has a screw-length to diameter ratio of 20:1 to 24:1 as set forth in Kirk-Othmer, supra, Vol. 14 (1967) at 276.

Typical of the polyethylene resins usable in the preparation of the extrudable thermoplastic compositions of this invention is a high density polyethylene resin marketed under the name of Petrothene by U.S. Industrial Chemicals Division of National Distillers and Chemicals Corp., New York, N.Y.

Generally, polyethylene-based compositions of this invention are extruded in the range from 300°–400° F., although the preferred range is 325°–350° F.

Polypropylene, as used herein, includes amorphous and isotactic and syndiotactic crystalline polypropylene. The crystalline polymers can be made with Ziegler-type transition metal catalysts, as put into practice by Natta et al. in the 1950's.

Polypropylene can be fabricated by extrusion or by injection molding. Exemplary of the polypropylene resins usable in making the extrudable compositions of this invention is Rexene brand of polypropylene, obtained from Rexine Polymers Co., Paramus, N.J. The temperature at which polypropylene-based compositions will be extruded is from about 300°–400° F., but preferably from about 350°–375° F.

"Filler," as used in the specification and claims, includes rice hull flour, walnut shell flour, pecan shell flour and cherry pit flour. These types of flours are milled from nutshell and grain wastes from shelling and processing plants.

Typical compositions for components of pecan shell are:

|  | % Moisture |
|---|---|
| composite | 13.8 |

-continued

| | % Moisture |
|---|---|
| shell without pith | 8.1 |
| Pith | 16.2 |
| pecan kernel | 12.0 |

For pecan shell flour ground to a fineness of less than 130 microns, as used herein, the following properties are typical:

| specific heat | 0.43 |
|---|---|
| moisture | 6.9% |
| Bulk density | 46 pounds/cubic foot |
| flash point | 380 degrees F. |
| charring temperature | 470 degrees F. |
| ash | 3% |

Size separation of these flours can be done by screening or by pneumatic classification processes. It is common to use screening or bolting cloths as fine as 300–400 mesh (0.04mm.) in the grain and carbon flour industries.

Size separation by screening is the separation of a mixture of various sizes of grains into at least two portions by screening surfaces, which act as multiple go and no-go gauges. The separate portions thus consist of grain particles more uniform in size than those of the original mixture. The subject of screening is discussed in Perry, "Chemical Engineers' Handbook," McGraw Hill, 4th ed. (1963), at 21–46. A conversion table showing the relationship between U.S. Sieve Series and Tyler Equivalents is given at 21–51. Thus, it will be appreciated that 200 mesh (Tyler) is equivalent to No. 200 sieve (0.074mm. opening).

It will therefore be understood that, as used herein, "finely-divided filler," means filler particles less than about 300 microns in diameter, that is, those defined as 120–400 mesh.

Lubricant as used herein, means liquid petrolatum or liquid paraffin, as defined at 788, "The Merck Index," Merck & Co., Rahway, N.J. 7th ed. (1960). Essentially, the lubricant is a mixture of liquid hydrocarbons from petroleum.

DESCRIPTION OF A PREFERRED EMBODIMENT

Preferred compositions according to this invention are those usable in extruders and containing a filler having up to about 3.0% by weight of water as compared to the weight of the filler and not the total weight of the composition. Although it is thought that the mineral oil functions as a lubricant for the filler material, addition of mineral oil in the indicated amounts also permits use of resin-shell flour compositions of relatively higher moisture content without loss of desirable extrudate properties.

Preferred compositions of this invention as thus those consisting essentially of a resin, from about 1% to about 30% by weight of a finely-divided filler selected from the group consisting of rice hull flour, cherry pit flour, pecan shell flour and walnut shell flour from less than 1% to up to about 5% by weight of mineral oil. The finely divided filler contains up to about 5.0% by weight of water as compared to the weight of the filler. However, optimum maximum moisture limits for unvented extruders as follows for each of the fillers:

| Rice | 2.0% |
|---|---|
| Cherry | 3.0% |
| Walnut | 3.0% |
| Pecan | 3.0% |

For a clearer understanding of this invention, specific examples thereof are set forth below. It is to be understood that the examples are merely illustrative and not limitative of the scope and underlying principles of the invention in any way.

EXAMPLE I

Blends of resins and fillers were made at filler loadings of 1, 5 and 10% by weight of the total composition, having 1.0% by weight of water as compared to the weight of the filler and at 1, 5 and 10% by weight of filler, and 2.0% by weight of mineral oil as compared to the total weight of the composition. The filler in the last example contained 2.0% of water.

The following resins were used:
a. polyamide — Zytel resin, E. I. duPont de Nemours and Co., Inc., Wilmington, Del.
b. Polystyrene — Dylite, Sinclair-Koppers Co., Pittsburgh, Pa.
c. polyethylene — High density Petrothene, U.S. Industrial Chemicals Division, National Distillers and Chemicals Corp., New York, N.Y.
d. polypropylene — Rexene, Rexine Polymers Co., Paramus, N.J.

The following flours were used: rice, cherry, walnut and pecan.

EXAMPLE II

Blends prepared as above containing a filler having up to about 1.0% by weight of water as compared to the weight of the filler were extruded from an unvented screw extruder having an L/D ratio of 72:1 and an orifice opening of 1 inch at the following temperatures:

| polyamide | 450–500 degrees F. |
|---|---|
| Polystyrene | 420 degrees |
| polyethylene | 325–350 degrees |
| polypropylene | 350–375 degrees |

Extrusions obtained in this way were splay-free and showed little or no tendency to warp or contract.

EXAMPLE III

Blends, obtained as above, containing 1, 5 and 10% by weight of filler having 2.0% by weight of water as compared to the weight of the filler, and 2.0% by weight of mineral oil were extruded from a vented screw extruder having an L/D ratio of 72:1 and an orifice diameter of 1 inch. Extrusions thus obtained were splay-free and exhibited little tendency to warp or contract.

EXAMPLE IV

Impact testing on extrusions obtained according to Examples II and III was done by Materials Consultants, Inc., P. O. Box 13718, Gainesville, Fla., 32601, following ASTM (American Society for Testing and Materials) test.

The following results were obtained:

Polypropylene Compositions
Impact strength (foot pounds) at % Loading (1.0%) of water

| Filler | 0 | 1 | 5 | 10 |
|---|---|---|---|---|
| Walnut flour | 0.5 | 0.25 | 0.30 | 0.24 |
| Pecan flour | | 0.40 | 0.28 | 0.30 |
| Cherry flour | | 0.30 | 0.25 | 0.30 |
| Rice flour | | 0.38 | 0.25 | |

% Loading (2.0% of Water as compared to weight of filler and 2.0% of mineral oil)

| | 3.5 |
|---|---|
| Rice Flour | 0.35 |

Polyamide Compositions

| Flour | % Loading | Impact Strength (foot pounds) |
|---|---|---|
| Walnut | 1 | 0.23 |
| Pecan | 1 | 0.55 |
| Cherry | 1 | 0.25 |
| Rice (a) | 1 | 0.73 |
| Rice | 5 | 0.53 |

(a) Plus 2.0% of mineral oil

Polyethylene Compositions
Impact Strength (foot pounds) at % Filler

| Filler | 0 | 1 | 5 | 8 | 10 |
|---|---|---|---|---|---|
| Rice flour | 0.80 | 0.50 | 0.40 | 0.60 | 0.40 |
| Cherry flour | | 0.40 | 0.40 | | 0.45 |
| Walnut flour | | 0.45 | 0.50 | | 0.55 |
| Pecan flour | | 0.40 | 0.50 | | 0.55 |

EXAMPLE V

Polystyrene blends according to Example I were evaluated by Styrex Industries, Inc., P. O. Box 5706, High Point, North Carolina 27262, on samples of Styrene 825 polymer containing various loadings of filler (pecan shell flour). The following results were obtained:

| | % Filler | | | |
|---|---|---|---|---|
| Test | 1 | 3 | 5 | 10 |
| Odor | OK | OK | OK | OK |
| Bends | 27 | 18 | 12 | 8 |
| Immediate impact | 2.24 | 1.88 | 1.60 | 1.32 |
| Aged impact | 1.56 | 1.56 | 1.48 | 1.04 |
| 0° F., impact | 0.96 | 0.88 | 0.80 | 0.56 |
| Tensile strength at yield, psi | 2496 | 2480 | 2416 | 3168 |
| Tensile strength at break, psi | 2512 | 2448 | 2336 | 2144 |

While a preferred embodiment of the invention has been described using specific terms, such description is for illustrative purposes only, and it is to be understood that changes and variations may be made without departing from the spirit or scope of the following claims.

What is claimed is:

1. A thermoplastic composition suitable for extrusion from an unvented extrusion apparatus consisting essentially of a thermoplastic resin selected from the group consisting of polyamides and polymers from ethylenically unsaturated monomers from about 1% to about 30% by weight of a finely-divided filler selected from the group consisting of rice hull flour, cherry pit flour, pecan shell flour and walnut shell flour; and said filler containing up to about 3.0% by weight of water based on the weight of the filler.

2. The composition of claim 1, wherein the resin is a polyamide.

3. The composition of claim 1, wherein the resin is selected from the group consisting of polystyrene, polyethylene and polypropylene.

4. A thermoplastic composition suitable for extrusion from a vented extrusion apparatus consisting essentially of a resin selected from the group consisting of polyamides and polymers from ethylenically unsaturated monomers; from about 1% to about 30% by weight of a finely-divided filler selected from the group consisting of rice hull flour, cherry pit flour, pecan shell flour and walnut shell flour, up to about 5.0% by weight of mineral oil; and said filler containing up to about 5.0% by weight of water based on the weight of the filler.

5. The composition of claim 4, wherein the resin is a polyamide.

6. The composition of claim 4, wherein the resin is selected from the group consisting of polystyrene, polyethylene and polypropylene.

7. The composition of claim 4, wherein the filler is rice hull flour and said filler contains up to about 5.0% by weight of water as compared to the weight of said filler.

8. The composition of claim 4, wherein the filler is pecan shell flour and said filler contains up to about 5.0% by weight of water as compared to the weight of said filler.

9. The composition of claim 4, wherein the filler is cherry pit flour and said filler contains up to about 5.0% by weight of water as compared to the weight of said filler.

10. The composition of claim 4, wherein the filler is walnut shell flour and said filler contains up to about 5.0% by weight of water based on the weight of said filler.

* * * * *